Aug. 23, 1966  J. TREILLET  3,268,269
FLUID PRESSURE BRAKING SYSTEMS
Filed Sept. 17, 1965
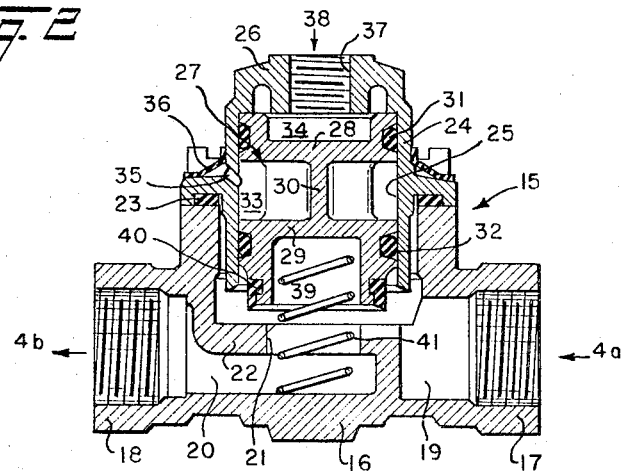
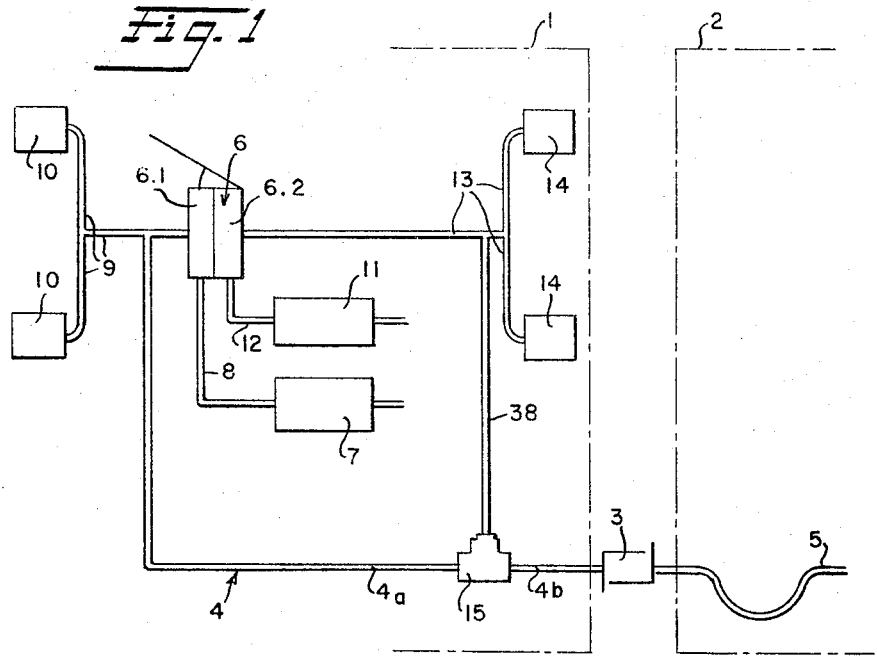

United States Patent Office 3,268,269
Patented August 23, 1966

3,268,269
FLUID PRESSURE BRAKING SYSTEMS
Jean Treillet, Champigny, France, assignor to Compagnie des Freins et Signaux Westinghouse, Paris, France, a limited-liability company of France
Filed Sept. 17, 1965, Ser. No. 488,056
6 Claims. (Cl. 303—7)

This invention relates to vehicle braking systems and more particularly to dual pressure braking circuits for tractor-trailer vehicles.

For mobile vehicles consisting of a tractor and at least one trailer, it is desirable for safety reasons and also by reason of highway safety laws to employ two braking circuits working completely independently of one another.

In practice, one of these circuits may govern the braking of the forward axle of the tractor and the axle or axles of the trailer, while the other circuit governs the braking of the rear axle or axles of the tractor. These circuits are hereinafter referred to as the first circuit and the second circuit.

This known special arrangement of the braking system has the disadvantage of depriving the tractor of its forward axle brakes if a breakdown occurs in the braking circuit of the trailer, for example in the case of a rupture in the line or in a coupling.

It is an object of this invention to overcome this disadvantage by providing means for isolating that portion of the first braking circuit associated with the trailer brakes, from that portion associated with the forward axle brakes of the tractor, as soon as the trailer brake line is opened to the atmosphere as a result of a breakdown.

In such a condition, the invention provides that the first braking circuit be split into two sections as between the tractor and the trailer, these two sections being connected to one another through the intermediary of an isolation valve governed by a mechanism capable of detecting an abnormal pressure drop at least in the section of the first cricuit corresponding to the trailer braking cylinders.

According to a particularly advantageous embodiment, the aforesaid detecting instrument is of the differential type and includes a device for comparing pressures obtaining in the first braking circuit and in the second braking circuit, this comparing device being tied into the mobile portion of the isolation valve.

Thus, the above-expressed object of the invention can be attained since, the moment the trailer brake line drops to a pressure below that obtaining in the braking circuit (second circuit) associated with the rear brakes of the tractor following a breakdown, the above-mentioned valve effectively isolates the portion of the first braking circuit associated with the trailer brakes from the other portion of this circuit associated with the forward axle brakes of the tractor.

It is, moreover, important to note that in this embodiment, the two braking circuits remain completely independent of each other.

Another object of this invention is to provide an isolation valve suited to the braking system described above. This valve includes a valve body having an upstream chamber communicating with that portion of the first braking circuit associated with the forward braking cylinders of the tractor, and a downstream chamber communicating with that portion of the first braking circuit associated with the braking cylinders of the trailer, and also includes a slidable piston separating the upstream chamber from a test-chamber communicating with the second braking circuit, said piston constituting the aforesaid comparing instrument and carrying an isolating valve controlled by a calibrated spring and disposed in an opening which normally communicates the upstream with the downstream chamber.

According to another characteristic, the comparing piston incorporated in the isolation valve has two transverse partitions rigidly connected together and defining, within the bore of the valve body in which the piston is guided, an intermediate mobile chamber open to the atmosphere, these partitions having air-tight joints.

Other characteristics of the invention will appear from the following description thereof, having regard to the accompanying drawing, in which like numbers refer to like parts throughout, and in which:

FIG. 1 is a schematic view of a braking system; and
FIG. 2 is a sectional view of an isolation valve used in the system of FIG. 1.

In FIG. 1 the tractor 1 and the trailer 2 of a mobile vehicle (tractor-trailer) are represented schematically by dot-dash lines, simply in order to locate in the braking system the main coupling 3 which provides an air-tight connection between the tractor air-line 4 and the trailer air-line 5, these air-lines supplying compressed air to the braking cylinders of the trailer.

As is well known, the braking system includes a double pedal-operated brake valve 6 of which the two component units 6.1 and 6.2 cooperate through separate paths with two independent braking circuits.

The first of these braking circuits includes a reservoir 7 connected through a line 8 to the entry port of the unit 6.1 of the pedal valve 6. The exit port of this unit 6.1 is connected on the one hand through air-lines 9 to the forward braking cylinders 10 of the tractor, and on the other hand through air-lines 4 and 5 through the main coupling 3, to the emergency relay valve governing the trailer braking cylinders.

The second braking circuit, independent of the first circuit considered above, includes a reservoir 11 connected through a line 12 to the entry port of the unit 6.2 of the pedal valve 6. The exit port of this unit 6.2 is connected through air-lines 13 to the rear braking cylinders 14 of the tractor 1.

Of course, the reservoirs 7 and 11 contain compressed air and are maintained under pressure by at least one compressor.

According to the invention, the line 4 linking the unit 6.1 of the valve 6 to the main coupling 3 is in two sections 4a and 4b connected to one another through the intermediary of an isolation valve 15. The latter is governed by a mechanism capable of detecting an abnormal pressure drop in the line 5 and the parts that the latter feeds in the trailer (particularly the braking cylinders). This detecting mechanism can be of any type: piezoelectric, pneumatic, mechanical, hydraulic, or other. In any event, the governing device interposed between the isolation valve and the detecting mechanism should be suited to the kind of information it receives from the detecting mechanism. For example, in the particular case where the said detecting mechanism is of the piezoelectric type, the governing device chosen could comprise a Wheatstone bridge interposed between, on the one hand, a variable resistance delivering a current which is a function of the position of the pedal of the valve 6 and, on the other hand, the terminals of a piezoelectric capsule which is connected to the line 4b, the current issuing from the bridge being directed across a diode to an amplifier provided for controlling, through the intermediary of a retarded relay, the excitor winding of an isolation electrovalve 15.

Moreover, it seems particularly advantageous that the detecting mechanism referred to above, regardless of the type, be set up so as to be capable of comparing the pressures obtaining in the braking circuit governed by the unit 6.1 of the valve 6 (first circuit) and in the braking circuit governed by the unit 6.2 of said valve (second circuit). A pneumatic embodiment of such a device is illustrated in FIG. 2 of the drawing.

In this embodiment, the body 16 of the isolation valve 15 incorporates two openings 17 and 18 which, respectively, are connected to the air-lines 4a and 4b and open into an upstream chamber 19 and a downstream chamber 20. These chambers can communicate with each other only through an opening 21 formed in an internal separating partition 22 of the body 16. Positioned on and fixed to the body, in an air-tight fashion due to an elastic washer 23, is a cap 24 defining an internal bore 25. The latter, open at one of its extremities, communicates with the upstream chamber 19, the other extremity being closed by the end 26 of the cap 24.

In the bore 25 there is slidingly mounted a piston 27 constituting the comparison detecting mechanism, mentioned above. The piston 27 has two transverse partitions 28 and 29 connected rigidly together by means of ribs 30. The piston partitions 28 and 29 are provided with sealing O-rings 31 and 32. The O-ring 31 isolates an interior mobile chamber 33, defined within the bore 25 by the partitions 28 and 29, from a test-chamber 34, situated between the partition 28 and the end 26. The intermediate chamber 33 is in constant communication with the atmosphere through an orifice 35 drilled in the cap 24 and protected by a lip-valve 36, while the test-chamber 34 is connected, by way of a tapped coupling borehole 37 in the end 26, to an air-line 38 connected into the air-line 13 of the second braking circuit 11, 12, 6.2, 13, 14.

In a similar way, the O-ring 32 isolates the intermediate chamber 33 from the upstream chamber 19. The partition 29 of the piston 27 has a tubular boss 39 projecting into the upstream chamber 19 and is provided with a flexible extension 40 forming a close-off valve and cooperating to this end with the portion of the partition 22 surrounding the opening 21. A coil spring 41 passing through said opening is interposed between the body 16 and the partition 29 of the piston and normally urges the valve 40 away from the partition 22 so as to tend to communicate the upstream chamber 19 with the downstream chamber 20.

The particular embodiment described above with reference to FIGURES 1 and 2 functions in the following manner:

As long as the portion of the first braking circuit associated with the trailer is in good condition, application of the brakes will give rise to equal air-pressures in the first circuit (6.1, 9, 10, 4, 15, 3, 5) and the second circuit (6.2, 13, 14, 38, 15). Expressed in another way, the pressure will be substantially the same in the test chamber 34 as is the upstream and downstream chambers 19 and 20. Since the areas of the piston partitions 28 and 29, against which act the pressures obtaining in the test chamber 34 and the upstream chamber 19, are identical, the forces exerted by these pressures on the piston will balance each other. In such a condition, the pressure of the spring 41 against the piston 27 maintains the valve 40 in the open position as shown in FIG. 2. As a result, communication is maintained through the opening 21 between the portion of the first braking circuit (6.1, 9, 10, 4a) corresponding to the forward brakes of the tractor and the other part of this first braking circuit (4b, 3, 5) corresponding to the trailer brakes.

When a breakdown occurs in the portion of the first braking circuit associated with the trailer, application of the brakes will not raise the pressure in that portion, the pressure on the contrary tending to remain at atmospheric level. In such a condition, the air-pressure is higher in the test chamber 34 connected to the second braking circuit (6.2, 13, 14, 38) than it is in the downstream chamber 20. As a result, as soon as the force exerted on the piston partition 28 by the air pressure in test chamber 34 rises above the combined forces exerted in the opposite direction by the spring 41 and the air pressure in chambers 19 and 20, the piston shifts downwardly and the valve 40 closes the opening 21, thus isolating the portion of the first circuit associated with the trailer brakes from the other portion of said circuit associated with the forward brakes of the tractor. As soon as the valve 40 has been closed, the pressure can rise in the latter part of the first circuit, and the brakes on the forward axle of the tractor become operable again.

It is important to note that the areas of the partitions 28 and 29 and the tension of the spring 41 are chosen such that the valve 40 will close as soon as the pressure difference between the first circuit (6.1, 9, 10, 4, 15, 3, 5) and the second circuit (6.2, 13, 14, 38) reaches a predetermined value slightly in excess of the maximum permissible difference between the two circuits.

The valve 40 remains closed as long as the driver presses on the pedal of the valve 6, and it opens when the pressure in the second braking circuit (6.2, 13, 14, 38) reaches a value such that the force that it exerts on the piston 27 is equal to or slightly less than the combined force applied to the piston by the spring 41, the pressure equivalent and the atmospheric pressure in the downstream chamber 20 of the upstream chamber 19. In reality, the valve 40 opens when the driver stops pressing on the pedal of the valve 6.

Finally, regarding the security of the system described above, it will be realized that the introduction of the isolation valve 15 in no way changes the independence of the circuits. Thus, if a breakdown occurs in the second braking circuit, associated with the rear brakes of the tractor (6.2, 13, 14, 38) the valve 40 remains open and the braking can take place on the forward axle of the tractor and on the axles of the trailer.

In case of deterioration of one of the O-rings 31, 32 or of one of the partitions 28, 29 of the piston 27, the corresponding braking circuit is placed in communication with the atmosphere by way of the orifice 35 of the cap 24. That circuit and only that circuit is put out of operation, but the leak resulting therefrom is immediately detectable by the driver who can then remedy it.

The invention is not to be limited only to the embodiments described and shown in detail, since many modifications can be made thereto without departing from the invention.

What is claimed is:

1. In a vehicle fluid pressure braking system having a first circuit governing a first and a second braking location, and a second circuit governing a third braking location, an isolation valve for isolating the one portion of the first circuit associated with the first braking location from the other portion thereof associated with the second braking location in case of a breakdown in either portion comprising, a valve body having an upstream chamber communicating with said one portion of the first circuit and a downstream chamber communicating with said other portion thereof, said chambers communicating with each other by way of an opening, a valve member for closing said opening, resilient means biasing said valve member away from said opening, and means for detecting the pressures in said first and second braking circuits and for closing said valve member onto said opening against the action of the resilient means when a pressure unbalance due to a breakdown in the first circuit is detected.

2. In a fluid pressure braking system for a tractor-trailer type vehicle having a first braking circuit governing the forward axle of the tractor and at least one axle of the trailer, and a second braking circuit governing the rear axle of the tractor, an isolation valve for isolating the one portion of the first circuit associated with the forward axle of the tractor from the other portion thereof associated with the trailer in case of a breakdown in either portion, comprising, a valve body having an upstream chamber communicating with said one portion of the first circuit and a downstream chamber communicating with the other portion thereof, said chambers communicating with each other by way of an opening, a valve member for closing said opening, resilient means biassing said valve member away from said opening, a test chamber communicating with said second circuit, and means responsive to the relationship between the test chamber pressure and the first circuit pressure for closing said valve member onto said opening against the action of the resilient means when a pressure unbalance due to a breakdown in the first circuit is detected.

3. In a system as set forth in claim 2, in which the last-mentioned means includes a slidable piston arranged to oppose the test chamber pressure against the pressure in the first circuit such that when the former exceeds the latter by a predetermined amount the piston closes the valve member onto the opening.

4. In a system as set forth in claim 3, in which the piston presents an equal area to each of the pressures, the valve member being secured to the piston, the piston being centered over said opening and being biassed away from said opening by a coil spring constituting said resilient means.

5. In a fluid pressure braking system for tractor-trailer type vehicles having a first braking circuit governing the forward axle of the tractor and at least one axle of the trailer, and a second braking circuit governing the rear axle of the tractor, an isolation valve for isolating the one portion of the first circuit associated with the forward axle of the tractor from the other portion thereof associated with the trailer in case of a breakdown in either portion, comprising, a valve body having an upstream chamber communicating with said one portion of the first circuit and a downstream chamber communication with the other portion thereof, said chambers communicating with each other by way of an opening, a valve member for closing said opening, the valve body having a cylindrical bore centered over said opening, a piston slidably mounted in said bore, the piston carrying said valve member, the part of the bore on the side of the piston remote from said opening constituting a test chamber, the test chamber being in communication with said second braking circuit, a coil spring biassing the piston and valve member away from the opening, such that when the pressures in the first and second braking circuits are substantially equal the coil spring operates to move the valve member from the opening and to establish communication between the upstream and the downstream chambers, and such that when the pressure in the second braking circuit exceeds that in the first braking circuit by an amount determined by the tension of the coil spring, the force of the latter is overcome and the valve member closes onto the opening.

6. In a system as set forth in claim 5, in which the piston comprises two, spaced, rigidly interconnected, transverse partitions defining between them an intermediate chamber sealed from both braking circuits by O-rings disposed at the periphery of the partitions, the wall of the bore having an orifice constantly communicating the intermediate chamber with the atmosphere.

References Cited by the Examiner
FOREIGN PATENTS 1,133,264   7/1962   Germany.

EUGENE G. BOTZ, *Primary Examiner.*